United States Patent
De Baere

(10) Patent No.: US 9,338,946 B2
(45) Date of Patent: May 17, 2016

(54) AGRICULTURAL BALER PROVIDED WITH MEANS FOR PREVENTING INCORRECT BALE LENGTH

(71) Applicant: CNH INDUSTRIAL AMERICA LLC, New Holland, PA (US)

(72) Inventor: Freek De Baere, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/764,051

(22) PCT Filed: Jan. 28, 2014

(86) PCT No.: PCT/EP2014/051597
§ 371 (c)(1),
(2) Date: Jul. 28, 2015

(87) PCT Pub. No.: WO2014/114809
PCT Pub. Date: Jul. 31, 2014

(65) Prior Publication Data
US 2016/0000013 A1   Jan. 7, 2016

(30) Foreign Application Priority Data
Jan. 28, 2013  (BE) .................................. 2013/0055

(51) Int. Cl.
*A01F 15/08* (2006.01)
*B30B 9/30* (2006.01)
*A01F 15/10* (2006.01)
*A01F 15/14* (2006.01)

(52) U.S. Cl.
CPC ......... *A01F 15/0825* (2013.01); *A01F 15/0875* (2013.01); *A01F 15/101* (2013.01); *A01F 15/14* (2013.01); *B30B 9/3007* (2013.01); *B30B 9/3014* (2013.01); *B30B 9/3078* (2013.01); *A01F 2015/0866* (2013.01)

(58) Field of Classification Search
CPC ... A01F 15/14; A01F 15/101; A01F 15/0825; A01F 15/0858; A01F 15/0875; A01F 2015/0866; A01F 15/08; B30B 9/3007; B30B 9/3014; B30B 9/3078
USPC ........... 100/2, 3, 4, 7, 45, 179, 188 R; 56/341
See application file for complete search history.

(56) References Cited

U.S. PATENT DOCUMENTS

| | | | |
|---|---|---|---|
| 2,701,517 A * | 2/1955 | Hauswirth | A01F 15/0858 100/4 |
| 4,711,078 A * | 12/1987 | Schaible | A01D 85/002 100/4 |
| 4,791,865 A | 12/1988 | Naaktgeboren | |
| 5,540,144 A | 7/1996 | Schrag et al. | |
| 5,782,175 A | 7/1998 | Schrag | |
| 7,779,755 B2 | 8/2010 | De Rycke et al. | |
| 8,915,182 B2 | 12/2014 | Van Groenigen | |

FOREIGN PATENT DOCUMENTS

WO     2011020754 A1    2/2011

* cited by examiner

Primary Examiner — Jimmy T Nguyen
(74) Attorney, Agent, or Firm — Patrick M. Sheldrake

(57) ABSTRACT

An agricultural baler for producing rectangular bales, provided with a baling chamber and reciprocating plunger and a bale length control system for producing bales of substantially equal length, and with a bale-eject system for evacuating the last bales from the chamber at the end of a harvesting run. The baler according to the invention is provided with one or more sensors configured to detect the activation of said bale-eject system, and configured to automatically reset said bale-length control system, when said sensors detect said activation.

8 Claims, 4 Drawing Sheets

AGRICULTURAL BALER PROVIDED WITH MEANS FOR PREVENTING INCORRECT BALE LENGTH

FIELD OF THE INVENTION

This application is the US National Stage filing of International Application Serial No. PCT/EP2014/051597 filed on Jan. 28, 2014 which claims priority to Belgian Application BE2013/0055 filed Jan. 28, 2013, each of which is incorporated herein by reference in its entirety.

The present invention is related to agricultural balers, used for picking up crop material such as hay or straw from the field or receiving crop material from a harvester, and forming it into rectangular bales. The invention is in particular related to systems for controlling the length of the individual bales.

STATE OF THE ART

Agricultural square or rectangular balers gather crop material into a baling chamber where the material is compressed by a reciprocating plunger to form rectangular bales. When a predetermined amount of crops have been gathered in the baling chamber and compressed by the plunger, a tying mechanism is activated to form a separately tied bale, which is subsequently pushed forward by the continued plunger action. The advance of the bales in the baling chamber is monitored by a bale-length control means, often involving a so-called 'star wheel' mounted above the moving bales and in contact therewith, so that the star wheel's rotation is actuated by the movement of the advancing bales. The star-wheel is operatively coupled to the tying mechanism, which is activated after a pre-determined number of rotations of the wheel.

Present-day harvesters are also equipped with a bale-eject system. This is a mechanism used to evacuate the bales from the baling chamber at the end of a harvesting run. As no more fresh crop material is being formed, the bales are no longer pushed forward by freshly compressed crop material, so they need to be advanced in another way. To this aim, the bale-eject system is manually activated. It may comprise a shuttle assembly as disclosed for example in WO-A-9629195 and EP-A-2108246, provided with pivotable tines which engage with the bale to push these bales towards the outlet of the baling chamber when the shuttle is pushed forward, and which slide past the bales when the shuttle is moved backwards. The shuttle assembly is driven by a hydraulic actuator mounted underneath the baling chamber.

A problem often occurs however at the end of a harvesting operation, when not enough crop material is available to form a full-length bale in the baling chamber. The remaining crop is compressed and forms a partially formed bale, coming up behind the last fully formed bale. When the last bales are evacuated from the baling chamber by the bale eject system, the partially formed bale also drives the star-wheel over a certain angle. In many existing systems, the partial rotation of the star wheel is saved and taken into account at the start of the next harvesting run. This results in an incorrect bale length of the first bale being formed in the next run.

SUMMARY OF THE INVENTION

The present invention is related to an agricultural baler for producing rectangular bales, provided with a baling chamber and reciprocating plunger, configured to move back and forth in the baling chamber, thereby compressing crop material and forming rectangular bales. The baler is further equipped with a bale length control system for producing bales of substantially equal length, and with a bale-eject system for evacuating the last bales from the chamber at the end of a harvesting run. In order to avoid errors in terms of bale length at the beginning of a next run, the baler according to the invention is provided with one or more sensors configured to detect the activation of said bale-eject system, and means to automatically reset said bale-length control system, when said sensors detect said activation. The invention is in particular related to a baler and to a method for operating a baler as described in the appended claims.

BRIEF DESCRIPTION OF THE FIGURES

FIG. 1a illustrates the normal operation. FIG. 1b illustrates the situation at the end of a harvesting run.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. In the context of this description, a 'harvesting run' is defined as a harvesting operation, wherein the baler is driven along a track, thereby continuously receiving crops in the baling chamber. A harvesting run may for example end when the baler reaches the end of a straight line. After the baler has been turned and put in position for harvesting a second track parallel to the first, a second harvesting run begins.

Figure 1A:
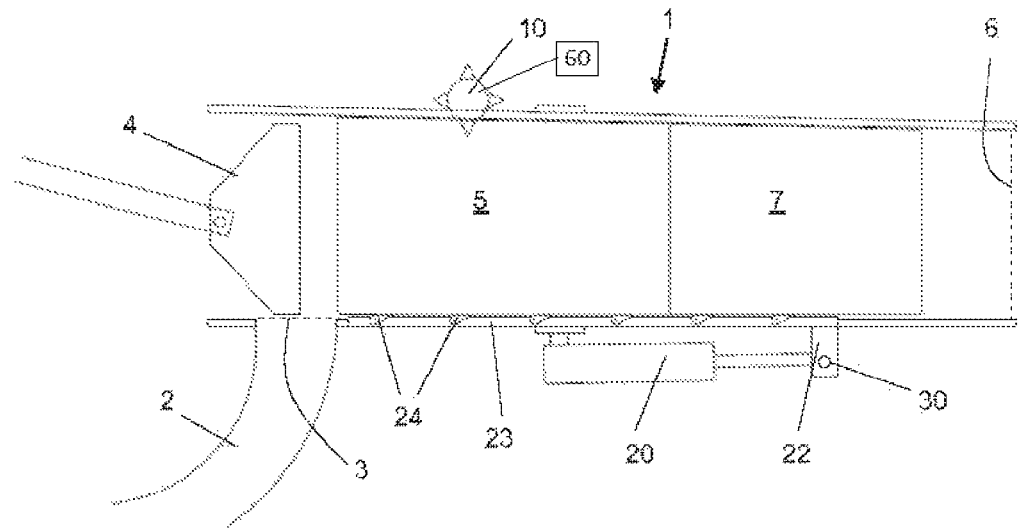
FIGS. 1a and 1b show simplified schematic side-views of a baling chamber including a star wheel for measuring progress of bales in the chamber, and a bale-eject system.

FIG. 1a shows a cross section of the baling chamber 1 in a simplified schematic drawing. Crop material is fed from a pre-compression chamber 2 that itself receives crops that are harvested from the ground through a suitable supply means (not shown). The material is fed into the baling chamber through an inlet section 3. Inside the chamber, a plunger 4 is arranged to move reciprocally in the longitudinal direction of the chamber. The movement of the plunger from left to right is coordinated with the feeding of pre-compressed material into the chamber through inlet section 3, so that each volume of pre-compressed material is pushed into the chamber and added to the mass 5 of compressed crops that is being formed inside the chamber and progressively pushed towards the baling chamber's outlet port 6. The walls of the baling chamber are slightly converging and usually also equipped with actuators (not shown) to exert an external pressure on the walls, so as to compress the crops as they progress towards the outlet port 6. After the outlet port 6 of the baling chamber, a bale chute 50 is mounted, shown in FIG. 1 in retracted, inoperable position. When extended behind the baling chamber in an operable position, the bale chute receives bales from the chamber and lowers the bales to the ground.

Figure 1B:
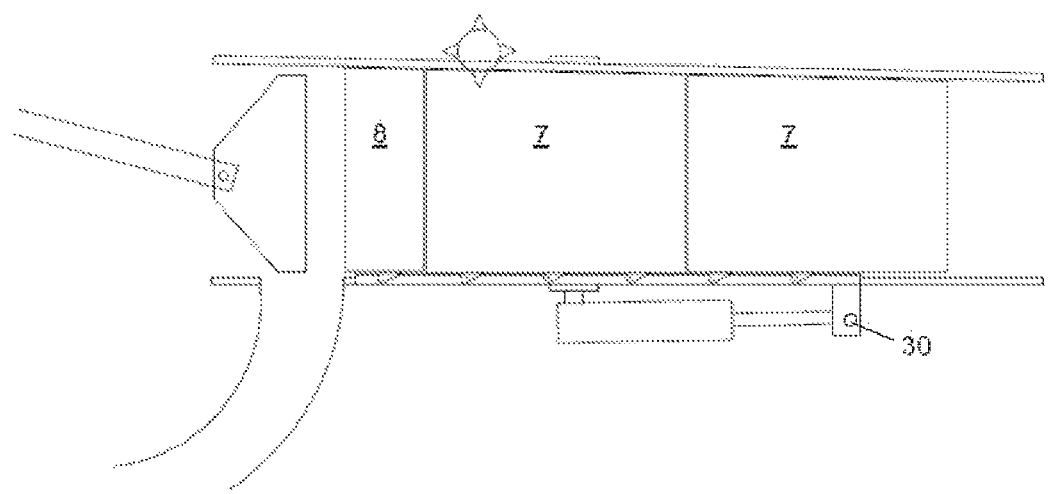

At the top of the baling chamber, a star-wheel 10 is mounted, which is a part of the bale-length control system of the baler. The rotation of this wheel is driven by the forward motion of the crop material inside the baling chamber ('forward' meaning: in the direction of the outlet port 6). The star wheel 10 is typically equipped with one or more encoders on its axis, to detect and measure the wheel's rotation, preferably in both directions, the forward and the backward direction. When a pre-defined number of rotations has been detected, a tying mechanism (not shown) is activated which ties together a pre-defined length of compressed crops to form separate bales 7. The bale length control system refers to the totality of hardware and software components configured to perform the above-described task of separating bales of substantially equal and predefined length. This may include electronic circuitry and memory means for acquiring signals from the encoder(s) and for processing these signals and calculating and storing a measured rotation of the star wheel as well as circuitry and electrical connections for generating and sending command signals to the tying mechanism. FIG. 1*b* shows the situation at the end of a harvesting run. The last of the crops supplied from the pre-compression chamber 2 have been fed into the baling chamber and compressed to form a bale 8 of shorter length than the pre-defined length of the bales 7. The bale-eject system will now be put in action to remove the last bales 7 and this shorter bale 8 from the baling chamber.

Figure 2:
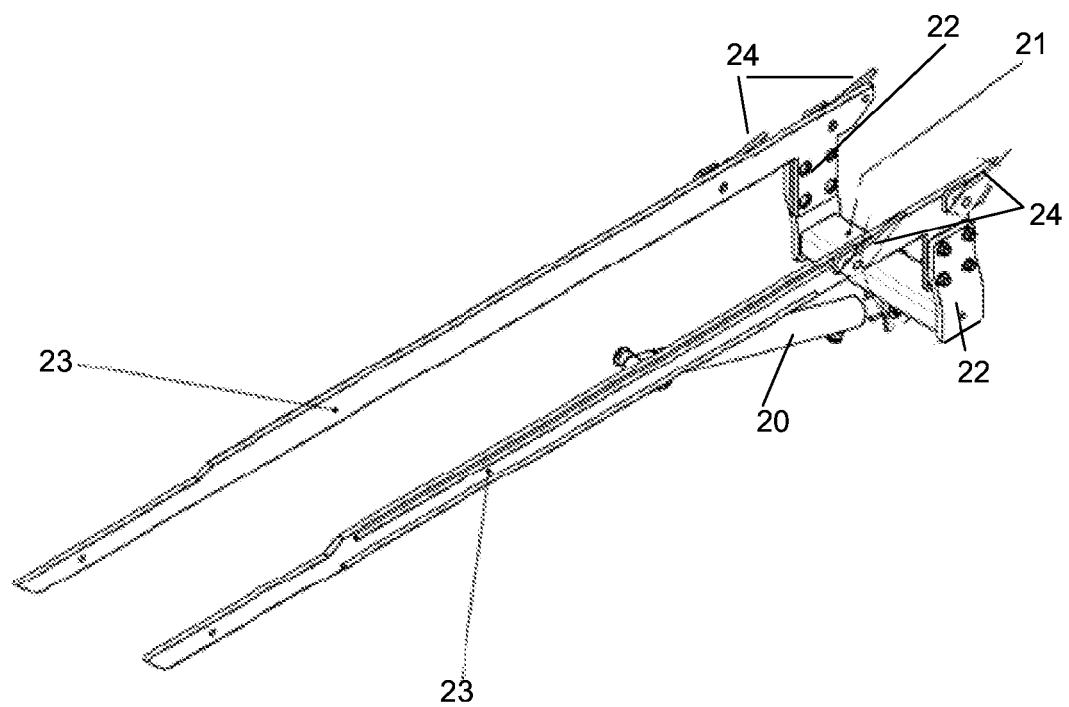
FIG. 2 illustrates the bale-eject system in more detail.

The bale eject system is also shown in a simplified manner in FIGS. 1*a* and 1*b*. FIG. 2 shows a 3D view of an actual bale-eject system. It comprises a hydraulic actuator 20 mounted underneath the baling chamber and arranged to actuate the movement of a cross bar 21 arranged between vertical side plates 22. Mutually parallel bars 23 are fixed to the side plates 22. The bars 23 are parallel to the movement direction of the bales, with rotatable tines 24 attached to the bars, the tines having pointed ends directed towards the outlet port 6 of the baling chamber. Tines can be present along the entire length of the bars 23 (as in FIGS. 1*a*/1*b*) or only on a portion of the bars 23 (as in FIG. 2). The bars 23 are guided in longitudinal rails (not shown) in the bottom of the baling chamber, preferably running in grooves on the floor of the baling chamber. When the cross bar 21 is pushed forward by the actuator 20, the tines 24 are pushed upwards so as to grip the bales and move them towards the outlet port 6 of the conveyor. When the cross bar 21 is pulled backwards by the actuator, the tines 24 glide past the bales in the baling chamber. In this way, reciprocal movement of the actuator 20 causes the standard length bales 7 and the shorter bale 8 to move towards the outlet port. The bale eject system is typically operable through manually controlled handles (not shown). As stated above, prior art systems suffer from the problem that the shorter bale 8 causes a partial rotation of the star wheel 10 during its removal by the bale-eject system, leading to errors in the length of the first formed bale in a next harvesting run.

Figure 3A:
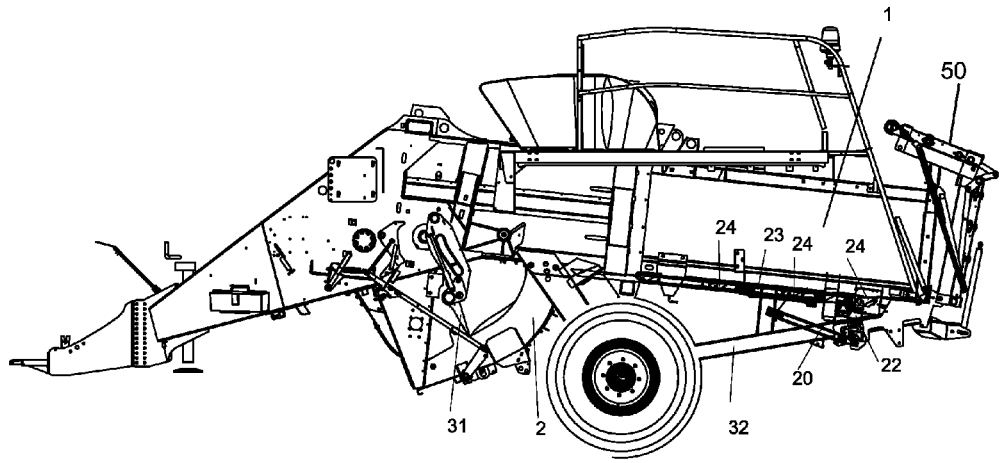
FIGS. 3a and 3b show side and rear views of a baler according to the invention, with parts removed for the sake of clarity.
Figure 3B:
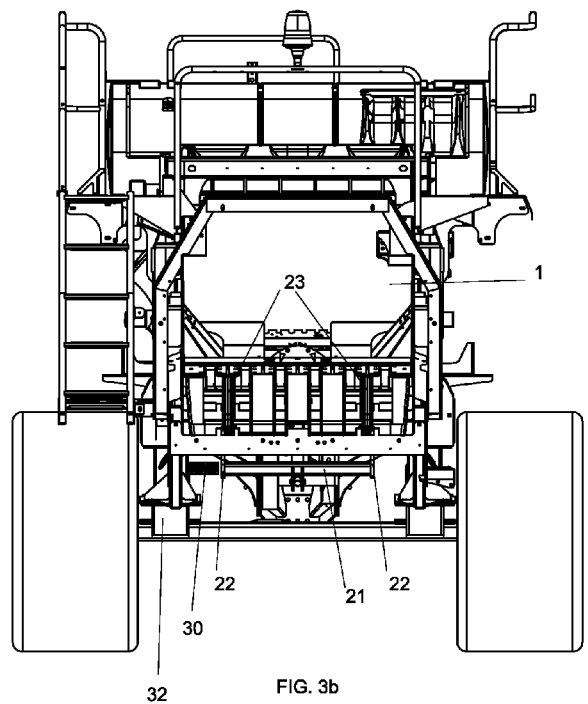

According to the invention, detection means are provided which are configured to detect the activation of the bale-eject system. These detection means may be provided in the form of one or more sensors, arranged for detecting movement of the bale eject system. In the embodiment shown in FIG. 1, a sensor 30 is placed on a structure (not shown) which is fixed with respect to the baling chamber, said sensor facing the side plate 22, and configured to detect the movement of this plate with respect to the chamber. FIGS. 3*a* and 3*b* show a side view and rear view of a rectangular baler, the rear view of FIG. 3*b* illustrating a possible mounting location of the sensor 30. The baler is provided with a stuffing mechanism 31 for loading crops from the pre-compression chamber 2 into the baling chamber 1. The bale eject system is visible, including the rotatable tines 24 mounted on bars 23, the actuator 20 and side plates 22. In the rear view, the bars 23 can be seen, arranged in grooves in the floor of the baling chamber. The cross bar 21 is visible as well. In the latter view, a sensor 30 is shown, mounted on one of the beams 32 of the baler's chassis, with respect to which the bale eject system is movably arranged. This is only an example of a possible mounting location of the sensor. Other suitable locations can easily be found by the person skilled in the art.

The sensor 30 can be any suitable type of sensor that can be used to detect motion of (preferably metal) surfaces at which the sensor is directed. A suitable sensor is a 'Namur-standard' sensor, known as such in the art. The location of the sensor with respect to the side plates 22 is preferably as close as possible to the back of the side plates 22 (i.e. the vertical edge of the side plates that is furthest away from the hydraulic actuator), because the cylinder of the hydraulic actuator 20 may extract a little when baling, as a consequence of possible leaks in the hydraulic system.

Figure 4:
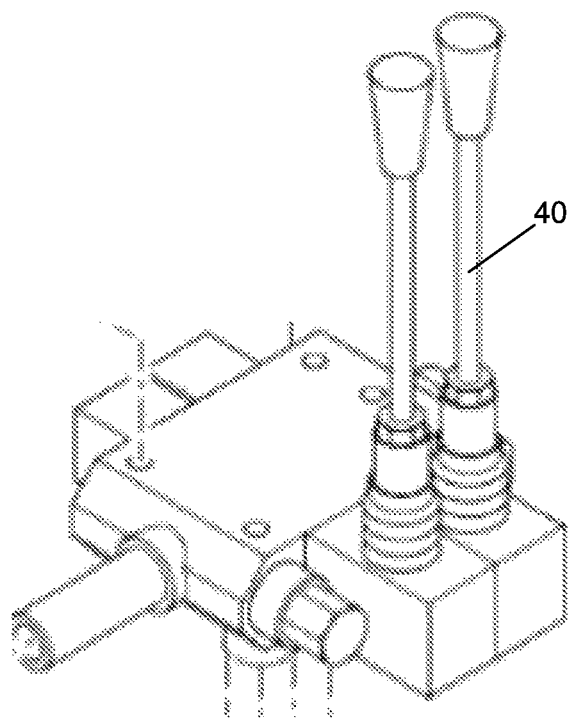
FIG. 4 shows an example of handles for commanding the bale-eject system.

According to another embodiment, a sensor can be placed to detect movement of the command handles 40 (see FIG. 4) for operating the bale eject system. As stated, other suitable locations are within the scope of the invention, as long as they allow the sensor to detect the bale ejection system's activation.

The baler is further equipped with a means 60 for resetting the bale length control system upon receiving a signal from the sensor 30. 'Resetting' signifies that the bale length control system is put in a condition wherein any advance of the crops measured up to the moment of resetting is not taken into account when the control system is again activated. This means for example that any recorded advance of the bales in the chamber is removed from the control system's memory means. When used in combination with an electronic bale length monitoring device (e.g. star wheel with encoder), the means for resetting is therefore preferably a computer loaded with suitably prepared software that automatically performs the resetting operation upon receiving a detection signal from the sensor 30. According to a preferred embodiment, the recorded length that is removed from the memory corresponds to the length of the shorter bale 8.

The resetting action removes this value or any other value recorded at the end of a harvesting run from the bale length control system, so that a next harvesting run begins without any negative impact from a previously measured bale progress in the baling chamber.

The invention claimed is:
1. An agricultural baler for producing rectangular bales comprising:
 a pre-compression chamber configured to received harvested crop material,
 a baling chamber having an inlet port and an outlet port, said baling chamber being configured to receive pre-compressed material through said inlet port from the pre-compression chamber, the baling chamber being equipped with a reciprocating plunger for forming said pre-compressed material into a rectangular shaped mass of compressed crop, and moving said mass towards said outlet port,
 a tying mechanism for tying together portions of said rectangular shaped mass so as to form separate bales,
 a bale-length control system comprising a sensor for measuring the progress of said mass of compressed crops in the baling chamber, and a sensor for activating said tying mechanism when a predefined progress has been reached, so as to obtain bales of predefined and substantially equal length,
 a bale-eject system, configured to move the last bales that are in the baling chamber out of the baler, when no more crop is being compressed by the plunger, at least one sensor for detecting the activation of said bale-eject system, and a computer for resetting the bale-length control system, wherein detection of activation of said bale-eject system resets said bale-length control system by said computer.

2. Baler according to claim 1, wherein said bale-eject system comprises:

bars that are slidable in rails on the bottom of the baling chamber, and an actuator mounted underneath the baling chamber, bars interconnected by a cross beam, said beam arranged between side plates, said actuator configured to push said cross beam and thereby said bars forwards and backwards in a longitudinal direction of the baling chamber, said bars provided with pivotable tines for gripping the bales when the bars move in the forward direction and to move past the bales when the bars move in the backward direction, and wherein the at least one sensor is mounted to detect a movement of said side plates with respect to the baling chamber.

3. Baler according to claim 1, comprising one or more handles for manually activating the bale eject system, wherein the at least one sensor is mounted to detect a movement of said one or more handles.

4. Baler according to claim 1, wherein the sensor for measuring the progress of the rectangular-shaped mass of compressed crops comprises a star-wheel and one or more encoders, and wherein the bale length control system is reset by the computer comprising an electronic memory and loaded with a software configured to remove any value related to the last measured progress from said memory.

5. A method for operating an agricultural baler comprising:

a pre-compression chamber, a baling chamber having an inlet port and an outlet port, said baling chamber configured to receive pre-compressed material through said inlet port from the pre-compression chamber, the baling chamber equipped with a reciprocating plunger for forming said pre-compressed material into a rectangular shaped mass, a tying mechanism for tying together portions of said rectangular shaped mass so as to form separate bales, a bale-length control system, comprising at least one sensor for measuring the progress of said mass of compressed crops in the baling chamber, and configured for activating said tying mechanism when a predefined progress has been reached, so as to obtain bales of pre-defined and substantially equal length, a bale-eject system, configured to move the last bales that are in the baling chamber out of the baler, when no more crop is being compressed by the plunger, the method comprising the steps of:

producing a set of rectangular bales of substantially equal length during a harvesting run, at the end of said run, compressing the last crops supplied to the baling chamber to form a rectangular bale that is shorter than said bales, leading to said shorter bale and at least one fully formed bale remaining in the baling chamber, activating the bale-eject system for removing said at least one fully formed bale and said shorter bale from the baling chamber, detecting said activation of the bale-eject system, and resetting the bale length-control system upon said detection.

6. Method according to claim 5, wherein said bale-eject system is equipped with bars that are slidable in rails on the bottom of the baling chamber, and an actuator mounted underneath the baling chamber, said bars being interconnected by a cross beam, said cross beam arranged between side plates, said actuator configured to push said cross beam and thereby said bars forwards and backwards in a longitudinal direction of the baling chamber, said bars provided with pivotable tines for gripping the bales when the bars move in the forward direction and to glide past the bales when the bars move in the backward direction, and wherein at least one sensor is mounted detect a movement of said side plates with respect to the baling chamber.

7. Method according to claim 5, wherein the baler comprises one or more handles for manually activating the bale eject system, and wherein at least one sensor is mounted so as to detect a movement of said one or more handles.

8. Method according to claim 5, wherein the at least one sensor for measuring the progress of the rectangular-shaped mass of compressed crops comprises a star-wheel and one or more encoders, and wherein the step of resetting the bale length control system comprises removing any value related to the progress of said shorter bale of compressed crops from a memory of a computer.

\* \* \* \* \*